United States Patent
Fang et al.

(10) Patent No.: US 9,761,186 B2
(45) Date of Patent: Sep. 12, 2017

(54) OVER-DRIVE VALUE GENERATING APPARATUS AND METHOD

(71) Applicant: Shenzhen China Star Optoelectronics Technology Co., Ltd., Guangdong (CN)

(72) Inventors: Bin Fang, Guangdong (CN); Chih-Wen Chen, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/373,636

(22) PCT Filed: Feb. 21, 2014

(86) PCT No.: PCT/CN2014/072374
§ 371 (c)(1),
(2) Date: Jul. 5, 2015

(87) PCT Pub. No.: WO2015/123859
PCT Pub. Date: Aug. 27, 2015

(65) Prior Publication Data
US 2015/0310813 A1    Oct. 29, 2015

(30) Foreign Application Priority Data
Feb. 19, 2014  (CN) .......................... 2014 1 0056852

(51) Int. Cl.
G09G 3/36       (2006.01)
H04N 13/04      (2006.01)
G09G 3/00       (2006.01)

(52) U.S. Cl.
CPC ........... *G09G 3/3611* (2013.01); *G09G 3/003* (2013.01); *G09G 3/3648* (2013.01);
(Continued)

(58) Field of Classification Search
CPC .... G09G 3/003; G09G 3/3648; G09G 3/3611; G09G 2320/0285; G09G 2360/145;
(Continued)

(56) References Cited

U.S. PATENT DOCUMENTS

8,471,921 B1 * 6/2013 Li ........................... H04N 9/045
                                                    348/222.1
8,675,054 B2 * 3/2014 Jung .................... G09G 3/3648
                                                    348/42
(Continued)

*Primary Examiner* — Vinh Lam (57) ABSTRACT

The present invention provides an over-drive value generating apparatus, which includes: a measuring module utilized to measure a plurality of brightness values shown by using a plurality of first-eye gray scales in every n scales and a plurality of second-eye gray scales in every n scales; an interpolation module utilized to linearly interpolate the brightness values into N×N brightness values which consist of N first-eye gray scales respectively corresponding to N second-eye gray scales; a calculating module utilized to calculate N×N crosstalk values of the N first-eye gray scales respectively switching to the N second-eye gray scales; and a determining module utilized to determine a first over-drive gray scale and a second over-drive gray scale. The present invention further provides a method for generating over-drive values.

7 Claims, 7 Drawing Sheets

(52) U.S. Cl.
CPC ..... *H04N 13/0402* (2013.01); *H04N 13/0438* (2013.01); *G09G 2320/0209* (2013.01); *G09G 2320/0252* (2013.01); *G09G 2320/0285* (2013.01); *G09G 2360/145* (2013.01)

(58) Field of Classification Search
CPC ... G09G 2320/0209; G09G 2320/0252; H04N 13/0402; H04N 13/0438
USPC .............................. 345/87–109; 348/683–690
See application file for complete search history.

(56) References Cited

U.S. PATENT DOCUMENTS

| | | | | |
|---|---|---|---|---|
| 2005/0168424 | A1* | 8/2005 | Nakamoto | G09G 3/3611 345/89 |
| 2011/0063332 | A1* | 3/2011 | Liao | G09G 3/003 345/690 |
| 2012/0154392 | A1* | 6/2012 | Kim | G02B 26/06 345/419 |
| 2012/0169720 | A1* | 7/2012 | Moh | H04N 13/0025 345/419 |
| 2012/0188348 | A1* | 7/2012 | Umeda | G09G 3/003 348/54 |
| 2012/0256903 | A1* | 10/2012 | Kim | H04N 13/0497 345/419 |
| 2012/0262556 | A1* | 10/2012 | Kuwahara | H04N 17/04 348/51 |
| 2013/0321247 | A1* | 12/2013 | Ajichi | G02B 27/26 345/55 |

* cited by examiner

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | 0.010 | 0.010 | 0.010 | 0.020 | 0.040 | 0.050 | 0.090 | 0.130 | 0.180 | 0.250 | 0.300 | 0.400 | 0.510 | 0.650 | 0.860 | 1.160 | 1.510 |
| 16 | 0.010 | 0.010 | 0.010 | 0.020 | 0.040 | 0.060 | 0.090 | 0.130 | 0.180 | 0.250 | 0.310 | 0.420 | 0.510 | 0.650 | 0.860 | 1.160 | 1.510 |
| 32 | 0.140 | 0.160 | 0.100 | 0.130 | 0.100 | 0.090 | 0.090 | 0.130 | 0.180 | 0.250 | 0.320 | 0.420 | 0.510 | 0.650 | 0.860 | 1.230 | 1.730 |
| 48 | 0.510 | 0.650 | 0.640 | 0.440 | 0.420 | 0.440 | 0.450 | 0.370 | 0.210 | 0.290 | 0.310 | 0.420 | 0.550 | 0.660 | 0.860 | 1.290 | 1.820 |
| 64 | 1.310 | 1.510 | 1.950 | 1.150 | 1.100 | 0.870 | 0.830 | 0.880 | 0.880 | 0.940 | 0.920 | 0.780 | 0.710 | 0.810 | 1.040 | 1.390 | 2.010 |
| 80 | 2.120 | 2.240 | 2.990 | 2.300 | 1.840 | 1.680 | 1.510 | 1.410 | 1.550 | 1.660 | 1.780 | 1.690 | 1.730 | 1.620 | 1.420 | 1.640 | 2.220 |
| 96 | 3.860 | 3.920 | 4.020 | 4.310 | 3.840 | 3.450 | 3.340 | 3.070 | 2.760 | 2.890 | 2.980 | 3.090 | 3.190 | 3.440 | 3.410 | 3.840 | 4.780 |
| 112 | 5.660 | 5.830 | 5.730 | 6.090 | 6.180 | 5.900 | 5.470 | 5.630 | 5.010 | 4.790 | 4.850 | 4.820 | 4.750 | 5.050 | 5.350 | 6.390 | 7.710 |
| 128 | 8.030 | 8.250 | 8.270 | 7.420 | 8.750 | 8.500 | 8.350 | 8.310 | 7.560 | 6.920 | 6.520 | 6.550 | 6.590 | 6.450 | 6.990 | 7.510 | 8.860 |
| 144 | 11.270 | 11.500 | 11.500 | 11.000 | 12.120 | 11.770 | 11.850 | 12.100 | 11.310 | 10.420 | 9.200 | 8.830 | 8.980 | 8.850 | 9.000 | 9.500 | 10.130 |
| 160 | 13.810 | 14.090 | 14.260 | 13.760 | 15.840 | 15.800 | 15.460 | 15.610 | 15.650 | 14.840 | 13.880 | 12.330 | 11.720 | 11.520 | 12.240 | 12.510 | 13.050 |
| 176 | 17.730 | 18.260 | 18.660 | 18.560 | 19.430 | 19.370 | 19.780 | 19.680 | 19.580 | 19.570 | 18.680 | 17.400 | 15.830 | 14.990 | 15.590 | 16.050 | 16.790 |
| 192 | 21.550 | 21.640 | 21.820 | 22.960 | 24.200 | 24.540 | 23.760 | 23.710 | 24.010 | 24.240 | 23.720 | 22.360 | 21.040 | 19.850 | 19.370 | 20.110 | 20.670 |
| 208 | 26.280 | 26.330 | 26.320 | 26.490 | 30.130 | 30.240 | 30.740 | 30.380 | 29.950 | 30.250 | 29.010 | 28.930 | 28.180 | 26.550 | 25.710 | 25.870 | 26.450 |
| 224 | 31.760 | 31.680 | 31.680 | 31.690 | 35.580 | 36.840 | 37.900 | 37.790 | 37.700 | 36.630 | 37.020 | 36.880 | 36.550 | 34.150 | 34.000 | 33.500 | 33.930 |
| 240 | 37.710 | 37.770 | 38.930 | 39.840 | 41.090 | 43.990 | 46.280 | 46.830 | 46.120 | 45.470 | 45.680 | 45.200 | 45.280 | 45.590 | 45.400 | 45.210 | 44.550 |
| 255 | 42.780 | 42.760 | 45.090 | 45.810 | 47.380 | 48.930 | 51.740 | 52.410 | 52.570 | 52.330 | 52.310 | 52.100 | 52.240 | 52.080 | 51.780 | 51.870 | 51.740 |

FIG. 5

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | 0.0% | 0.0% | 0.0% | 2.3% | 2.8% | 2.4% | 2.4% | 2.1% | 2.2% | 2.3% | 2.1% | 2.2% | 2.4% | 2.4% | 2.5% | 2.5% | 2.9% |
| 16 | -54.3% | 0.0% | 0.0% | 2.3% | 2.8% | 3.0% | 2.4% | 2.1% | 2.2% | 2.3% | 2.2% | 2.4% | 2.4% | 2.4% | 2.5% | 2.5% | 2.9% |
| 32 | -44.4% | -66.7% | -58.8% | 8.8% | 0.0% | -0.6% | -0.3% | 0.5% | 1.1% | 1.4% | 1.6% | 1.8% | 2.0% | 2.1% | 2.2% | 2.5% | 3.2% |
| 48 | -16.3% | -48.8% | -85.0% | -7.6% | -3.0% | 0.0% | 0.3% | -1.3% | -3.2% | -1.5% | -1.0% | -0.1% | 0.5% | 0.8% | 1.3% | 1.9% | 2.7% |
| 64 | -19.3% | -37.6% | -82.9% | -50.0% | -27.6% | -39.7% | -12.1% | -4.9% | -3.4% | -1.7% | -1.4% | -2.0% | -2.0% | -1.1% | -0.2% | 0.7% | 1.8% |
| 80 | -26.3% | -33.5% | -21.0% | -33.4% | -22.3% | -6.6% | -10.2% | -6.8% | -2.2% | -0.2% | 0.8% | 0.1% | 0.3% | -0.2% | -0.8% | -0.1% | 1.1% |
| 96 | -15.6% | -17.4% | -1.8% | -8.9% | -12.1% | -6.8% | 7.0% | -11.8% | -13.4% | -6.3% | -3.4% | -1.8% | -0.8% | 0.4% | 0.2% | 1.2% | 3.0% |
| 112 | -0.5% | -3.6% | -8.1% | 3.3% | -16.6% | -14.0% | -16.0% | -32.0% | -30.5% | -17.4% | -9.5% | -6.9% | -5.7% | -2.8% | -1.0% | 1.9% | 4.5% |
| 128 | -4.8% | -7.7% | -9.9% | -5.3% | -17.6% | -14.8% | -19.4% | -33.7% | -29.9% | -26.3% | -18.3% | -11.4% | -8.0% | -6.4% | -2.5% | -0.4% | 2.7% |
| 144 | -7.6% | -9.8% | -2.8% | 0.9% | -15.3% | -15.7% | -15.0% | -21.0% | -28.5% | -28.2% | -37.2% | -23.7% | -14.1% | -10.1% | -6.2% | -2.8% | -0.8% |
| 160 | 0.5% | -1.5% | -7.3% | -6.8% | -12.5% | -12.5% | -16.9% | -19.4% | -22.4% | -31.3% | -36.4% | -44.0% | -30.2% | -18.6% | -8.2% | -4.4% | -2.2% |
| 176 | -1.9% | -4.9% | -3.7% | -9.3% | -15.8% | -18.1% | -15.4% | -17.3% | -22.2% | -30.3% | -37.4% | -36.3% | -43.1% | -26.3% | -10.9% | -4.9% | -1.8% |
| 192 | -2.4% | -2.9% | 0.9% | 0.2% | -14.1% | -14.8% | -18.1% | -18.3% | -18.0% | -23.0% | -19.4% | -26.0% | -29.6% | -21.6% | -12.9% | -3.8% | -1.2% |
| 208 | 1.0% | 0.8% | 6.8% | 6.9% | -4.8% | -8.8% | -12.7% | -13.4% | -14.0% | -11.2% | -15.0% | -17.3% | -19.7% | -2.0% | -11.3% | -3.6% | -0.4% |
| 224 | 6.6% | 6.8% | 13.9% | 12.0% | 9.3% | 2.8% | -2.6% | -4.1% | -2.4% | -0.7% | -1.5% | 0.0% | -0.3% | -2.0% | -1.7% | -4.5% | -0.4% |
| 240 | 16.6% | 16.5% | 13.9% | 12.0% | 9.3% | 2.8% | -2.6% | -4.1% | -2.4% | -0.7% | -1.5% | 0.0% | -0.3% | -2.0% | -1.7% | -4.5% | -0.4% |
| 255 | 17.3% | 17.4% | 12.9% | 11.6% | 8.6% | 5.6% | 0.0% | -1.5% | -1.9% | -1.4% | -1.5% | -1.0% | -1.6% | -1.3% | -0.2% | -2.0% | -10.1% |

OVER-DRIVE VALUE GENERATING APPARATUS AND METHOD

RELATED APPLICATIONS

This application is a National Phase of PCT Patent Application No. PCT/Cn2014/072374 having International filing date of Feb. 21, 2014which claims the benefit of priority of Chinese Patent Application No. 201410056852.2 filed on Feb. 19, 2014. The contents of the above applications are all incorporated by reference as if fully set forth herein in their entirety.

FIELD OF THE INVENTION

The present invention relates to an apparatus and method for generating an over-drive value in a liquid crystal display, and especially to an apparatus and method for generating an over-drive value in a three-dimensional (3D) display device used with shutter glasses.

BACKGROUND OF THE INVENTION

With the development of technology, what users seek is no longer in high-definition images, but more three-dimensional and realistic image display. In the 3D display technology, 3D glasses are a usual application, and shutter glasses are commonly used in the 3D glasses technology.

The main feature of the shutter glasses 3D technology is that a right-eye lens is closed when a left-eye lens is open, thereby enabling the user to view a left-eye image. On the contrary, the left-eye lens is closed when the right-eye lens is open, thereby allowing the user to view a right-eye image. Since the left and right eyes respectively view the different images, the images fuse in the brain of the viewer for sensing 3D vision.

In watching 3D TV, what the viewer concern is the displayed 3D effect, that is, 3D graphics. To date, the most important factor influencing the 3D effect of 120Hz or 240Hz shutter is crosstalk. The crosstalk is caused by the viewer's left eye sees the image content which should be viewed by the right eye, or the right eye sees the image content which should be seen by the left eye. In addition, a main factor causing the crosstalk appearing in 3D images is bad synchronization between response time of a liquid crystal display (LCD) and lighting timing of backlight scanning in the LCD module. Under the 3D images, how to make liquid crystal molecules fast reach a steady state for ensuring that every frame of the images can correctly enter the corresponding left and right eyes of the viewer is solved generally by means of increasing an overvoltage in advance. Each LCD has an over-drive look-up table, and accuracy of over-voltage parameters (gray scale) directly affects speed and preciseness of twist of the liquid crystal molecules in the LCD.

However, at present, every over-drive gray scale in the over-drive look-up table is sought by repeatedly entering different gray scales and repeatedly measuring for obtaining the suitable over-drive gray scale, but this method is extremely time-consuming and has low accuracy to greatly affect the 3D effect when viewing. Hence, currently, how to fast and accurately find out the suitable over-drive gray scale is an urgent problem for 3D TV manufacturers.

SUMMARY OF THE INVENTION

An objective of the present invention is to provide an over-drive value generating apparatus for fast and accurately determining the over-drive values.

An objective of the present invention is to provide a method for generating over-drive values, thereby fast and accurately determining the over-drive values.

To achieve the foregoing objective, a preferred embodiment of the present invention provides an over-drive value generating apparatus, which is applied to a 3D display device used with shutter glasses. The 3D display device includes a first gray scale i of a pixel for displaying a first-eye image and a second gray scale j of a corresponding pixel for displaying a second-eye image. The over-drive value generating apparatus includes: a measuring module utilized to measure a plurality of brightness values shown by using a plurality of first-eye gray scales in every n scales and a plurality of second-eye gray scales in every n scales at a first-eye channel of the shutter glasses; an interpolation module utilized to linearly interpolate the brightness values into N×N brightness values which consist of N first-eye gray scales respectively corresponding to N second-eye gray scales, wherein n and N are positive integers and N>n; a calculating module utilized to calculate N×N crosstalk values of the N first-eye gray scales respectively switching to the N second-eye gray scales according to the N×N brightness values; and a determining module utilized to determine a first over-drive gray scale i' and a second over-drive gray scale j' according to the N×N crosstalk values, such that the brightness value of the pixel being in the second over-drive gray scale j' and the corresponding pixel being in the first over-drive gray scale i' is about equal to the brightness value of both the pixel and the corresponding pixel being in the first gray scale i; and such that the brightness value of the pixel being in the first over-drive gray scale i' and the corresponding pixel being in the second over-drive gray scale j' is about equal to the brightness value of both the pixel and the corresponding pixel being in the second gray scale j.

In one preferred embodiment of the present invention, the N×N crosstalk values include a plurality of rising crosstalk values and falling crosstalk values. Specifically, the determining module includes: a selection unit utilized to select a first group of multiple falling crosstalk values less than a first numeric value among the falling crosstalk values, and then selecting a second group of the rising crosstalk values less than a second numeric value among the rising crosstalk values; a computing unit utilized to compute sums of the rising crosstalk value to the power of p and the falling crosstalk value to the power of q for every pair of the first gray scale and the second gray scale from a plurality of pairs of the first gray scales and the second gray scales corresponding to the first group and the second group; and a decision unit utilized to select the first gray scale and the second gray scale corresponding to a minimum sum among the sums from the plurality of pairs of the first gray scales and the second gray scales to be utilized as the first over-drive gray scale i' and the second over-drive gray scale j'. In the embodiment, both p and q are positive integers, and p is larger than q.

Preferably, the n scales are smaller than or equal to 8 scales, and N is 256. In one preferred embodiment of the present invention, the interpolation module is a linear interpolation module.

Another preferred embodiment of the present invention provides a method for generating over-drive values, which is applied to a 3D display device used with shutter glasses. The 3D display device includes a first gray scale i of a pixel for displaying a first-eye image and a second gray scale j of a corresponding pixel for displaying a second-eye image. The method for generating over-drive values includes the steps of: measuring a plurality of brightness values shown by a plurality of first-eye gray scales in every n scales and a plurality of second-eye gray scales in every n scales at a first-eye channel of the shutter glasses; interpolating the brightness values into N×N brightness values which consist of N first-eye gray scales respectively corresponding to N second-eye gray scales, wherein n and N are positive integers and N>n; calculating N×N crosstalk values of the N first-eye gray scales respectively switching to the N second-eye gray scales according to the N×N brightness values; and determining a first over-drive gray scale i' and a second over-drive gray scale j' according to the N×N crosstalk values, such that the brightness value of the pixel being in the second over-drive gray scale j' and the corresponding pixel being in the first over-drive gray scale i' is about equal to the brightness value of both the pixel and the corresponding pixel being in the first gray scale i; and such that the brightness value of the pixel being in the first over-drive gray scale i' and the corresponding pixel being in the second over-drive gray scale j' is about equal to the brightness value of both the pixel and the corresponding pixel being in the second gray scale j.

In one preferred embodiment of the present invention, the N×N crosstalk values include a plurality of rising crosstalk values and falling crosstalk values. Specifically, the step of determining includes: selecting a first group of multiple falling crosstalk values less than a first numeric value among the falling crosstalk values, and then selecting a second group of the rising crosstalk values less than a second numeric value among the rising crosstalk values; computing sums of the rising crosstalk value to the power of p and the falling crosstalk value to the power of q for every pair of the first gray scale and the second gray scale from a plurality of pairs of the first gray scales and the second gray scales corresponding to the first group and the second group; and selecting the first gray scale and the second gray scale corresponding to a minimum sum among the sums from the plurality of pairs of the first gray scales and the second gray scales to be utilized as the first over-drive gray scale i' and the second over-drive gray scale j'.

In one preferred embodiment of the present invention, the interpolation step is linear interpolation.

In comparison with the prior art, the over-drive value generating apparatus of the present invention employs the interpolation module which is capable of reducing the number of times for measuring the brightness values. In addition, a set of the suitable over-drive gray scales (i', j') can be fast and accurately calculated by the computation of the crosstalk values and the processing of the determining module, whereby adjustment error and low efficiency brought by manual operation can be avoided.

It is to be understood that both the foregoing general description and the following detailed description of the present invention are exemplary and explanatory and are intended to provide further explanation of the invention as claimed.

DESCRIPTION OF THE DRAWINGS

FIG. 4 is a 16×16 GTG brightness data sheet according to one embodiment;

FIG. 5 is a data sheet of 16×16 crosstalk values computed from FIG. 4;

DETAILED DESCRIPTION OF THE PREFERRED EMBODIMENTS

Descriptions of the following embodiments refer to attached drawings which are utilized to exemplify specific embodiments.

Figure 1:
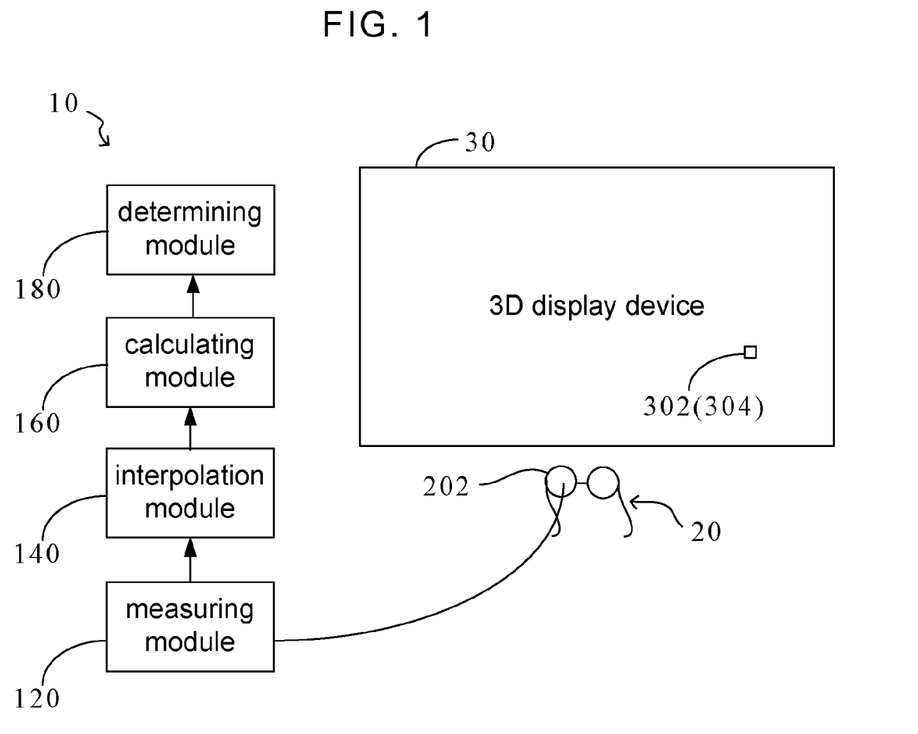
FIG. 1 is a block diagram illustrating an over-drive value generating apparatus according to a preferred embodiment of the present invention.

Referring to FIG. 1, FIG. 1 is a block diagram illustrating an over-drive value generating apparatus according to a preferred embodiment of the present invention. The over-drive value generating apparatus 10 of the embodiment is applicable to a 3D display device 30 used with shutter glasses 20. The 3D display device 30 includes a first gray scale i of a pixel 302 for displaying a first-eye (e.g. left eye or right eye) image and a second gray scale j of a corresponding pixel 304 for displaying a second-eye (e.g. right eye or left eye) image. It should be noted that the pixel 302 and the corresponding pixel 304 are the same pixel in the 3D display device 30, and are one of red(R), green(G) and blue(B) sub pixels.

The over-drive value generating apparatus 10 generates the over-drive gray scales of the first gray scale i, which is utilized to display the first-eye image, and the second gray scale j, which is utilized to display the second-eye image. Both the first gray scale i and the second gray scale j are positive integers and less than a total gray scale N. Specifically, the gray scale N is 8 bits, i.e. 256 gray scales. Both i and j belong to a range of 0 to 255.

As shown in FIG. 1, the over-drive value generating apparatus 10 includes a measuring module 120, an interpolation module 140, a calculating module 160, and a determining module 180. The measuring module 180 is utilized to measure a plurality of brightness values shown by using a plurality of first-eye gray scales in every n scales and a plurality of second-eye gray scales in every n scales at a first-eye channel (left-eye lens or right-eye lens) 220 of the shutter glasses 20. For instance, using the measurement of the right-eye brightness as an example, we define L (i, i) as the brightness of the right-eye lens when the left-eye image displays the gray scale i, and the right-eye image also displays the gray scale i, simultaneously.

L(i, j) is defined as the brightness of the right-eye lens when the left-eye image displays the gray scale i, and the right-eye image also displays the gray scale j. Other expressions may be deduced by analogy. It should be noted that "L" indicates the lightness, not left.

Figure 2:
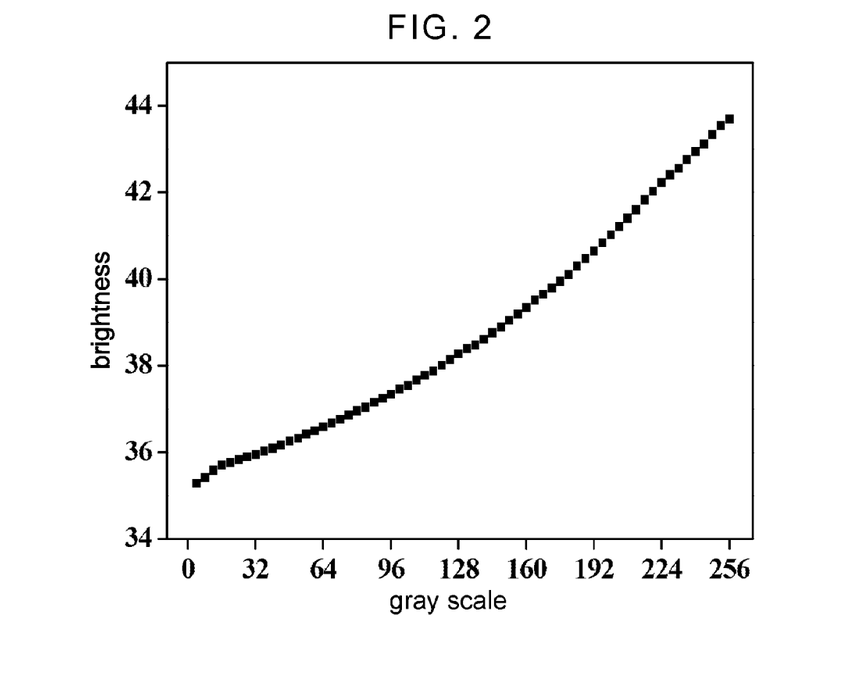
FIG. 2 is a plot of measured data under a right-eye gray scale being fixed at 255 according to a preferred embodiment of the present invention.

In the embodiment, the measuring module 120 is a luminance meter. Preferably, the n scales are smaller than or equal to 8 scales. In the embodiment, the n scales are 4 scales. After the measurement, a 64×64 Gray-To-Gray (GTG) brightness data sheet can be obtained. Referring to FIG. 2, FIG. 2 is a plot of the measured data under the right-eye gray scale being fixed at 255 according to a preferred embodiment of the present invention, wherein the x-coordinate denotes the gray scale; the y-coordinate denotes the brightness whose unit of measurement is nits (cd/m2). It should be noted that what FIG. 2 shows is only 64 (i.e., 64 ×1) brightness values measured under the right-eye gray scale being fixed at 255. Actually, the GTG brightness data sheet further includes multiple such plots of the measured data under the right-eye gray scale being fixed at 0 to 254.

Figure 3:
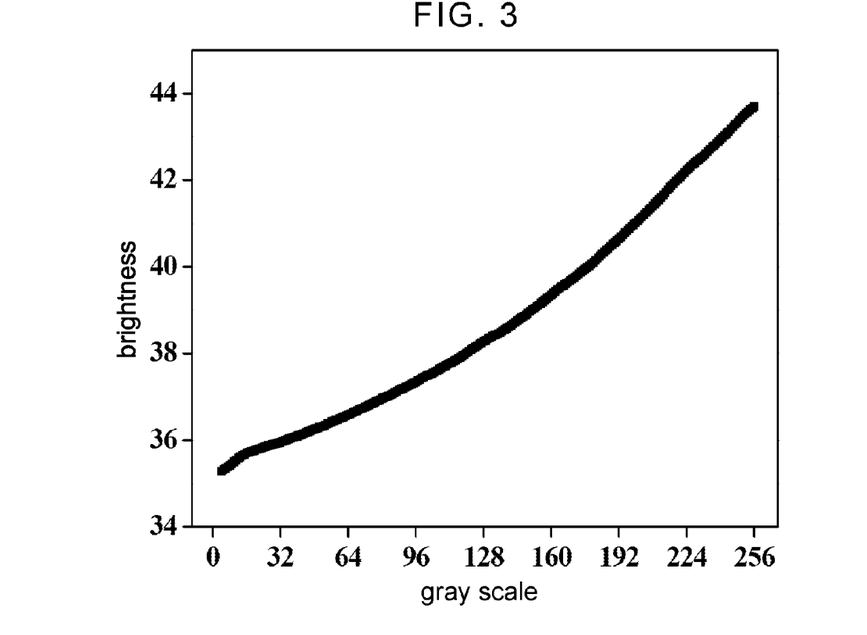
FIG. 3 is a plot of interpolated data from FIG. 2.

The interpolation module 140 is utilized to linearly interpolate the brightness values into N×N brightness values which consist of N first-eye gray scales respectively corresponding to N second-eye gray scales, where n and N are positive integers, and N>n. Referring to FIG. 3, FIG. 3 is a plot of the interpolated data from FIG. 2. In the embodiment, the interpolation module 140 linearly interpolates the brightness values into 256×256 brightness values, i.e. 256×256 GTG brightness data sheet, which consists of 256 first-eye gray scales respectively corresponding to 256 second-eye gray scales. Preferably, the interpolation module is a linear interpolation module. Through the treatment of the interpolation module 140, the brightness curve after the linear interpolation preserves a smooth migration path and does not affect the trend of the GTG brightness distribution. Accordingly, a considerably large number of such measurements of the brightness values can be reduced.

The calculating module 160 calculates N×N crosstalk values of the N first-eye gray scales respectively switching to the N second-eye gray scales 160 according to the N×N brightness values. In the embodiment, the N×N crosstalk values are 256×256 crosstalk values. Referring to FIG. 4 and FIG. 5, FIG. 4 is a 16×16 GTG brightness data sheet according to one embodiment; FIG. 5 is a data sheet of 16×16 crosstalk values computed from FIG. 4. Since the data of 256×256 are too harsh, in order to explain clearly. FIG. 4 and FIG. 5 illustrate the data just every 16 gray scales. The top row in the data sheets represents the right-eye gray scales, and the leftmost column therein represents the left-eye gray scales. Furthermore, let the left eye to be a target of measuring the gray scales, i.e. measuring the brightness at the left-eye channel.

Specifically, the N×N crosstalk values include a plurality of rising crosstalk values and falling crosstalk values. More specifically, the rising crosstalk value of the embodiment is a GTG rising crosstalk value (Crosstalk$_{rising}$), which is defined as a percentage (evaluate lightness is bright enough) of a difference between a brightness of a bright state and a target brightness of a high gray scale to another difference between the target brightness of the high gray scale and a target brightness of a low gray scale under a 3D switching state between two different gray scales. For example, in order to compute the brightness (using the right-eye channel as an example) of a 3D image with a left-eye image gray scale denoted by i and a right-eye image gray scale denoted by j, where i>j, the target brightness of the high gray scale is indicative of L(i, i), the target brightness of the low gray scale is indicative of L(j, j), and the brightness of the bright state is L(j, i). Therefore, the GTG rising crosstalk value is:

$$\mathrm{Crosstalk}_{rising} = \frac{L(i, i) - L(j, i)}{L(i, i) - (j, j)},$$

where the Crosstalk$_{rising}$ is the GTG rising crosstalk value of the left-eye image gray scale denoted by i and the right-eye image gray scale denoted by j.

Similarly, the falling crosstalk value of the embodiment is a GTG falling crosstalk value (Crosstalk$_{falling}$), which is defined as a percentage (evaluate darkness is dark enough) of a difference between a brightness of a dark state and a target brightness of a low gray scale to another difference between a target brightness of a high gray scale and the target brightness of the low gray scale under a 3D switching state between two different gray scales. For example, in order to compute the brightness (using the right-eye channel as an example) of a 3D image with a left-eye image gray scale denoted by i and a right-eye image gray scale denoted by j, where i>j, the target brightness of the high gray scale is indicative of L(i, i), the target brightness of the low gray scale is indicative of L(j, j), and the brightness of the dark state is L(i, j).

Therefore, the GTG falling crosstalk value is:

$$\mathrm{Crosstalk}_{falling} = \frac{L(i, j) - L(j, j)}{L(i, i) - (j, j)},$$

where the Crosstalk$_{falling}$ is the GTG falling crosstalk value of the left-eye image gray scale denoted by i and the right-eye image gray scale denoted by j.

Referring to FIG. 5, according to the above definition, as to the left-eye channel, the data at the lower left of a diagonal line (identical gray scale i=j) are the rising crosstalk value; the data at the upper right of the diagonal line are the falling crosstalk value.

Subsequently, the determining module 180 determines a first over-drive gray scale i' and a second over-drive gray scale j' according to the above-mentioned N×N crosstalk values such that the brightness value of the pixel 302 being in the second over-drive gray scale j' and the corresponding pixel 304 being in the first over-drive gray scale i' is about equal to the brightness value of both the pixel 302 and the corresponding pixel 304 being in the first gray scale i; and such that the brightness value of the pixel 302 being in the first over-drive gray scale i' and the corresponding pixel 304 being in the second over-drive gray scale j' is about equal to the brightness value of both the pixel 302 and the corresponding pixel 304 being in the second gray scale j. In short, L(j', i')=L(i, i) and L(i', j')=L(j, j) are satisfied. That is to say, the right-eye brightness doesn't vary with the change of the left-eye gray scales, and the left and right eyes have no cross-talk with each other. Ideally, what FIG. 2 and FIG. 3 shows should be a horizontal line.

Figure 6:
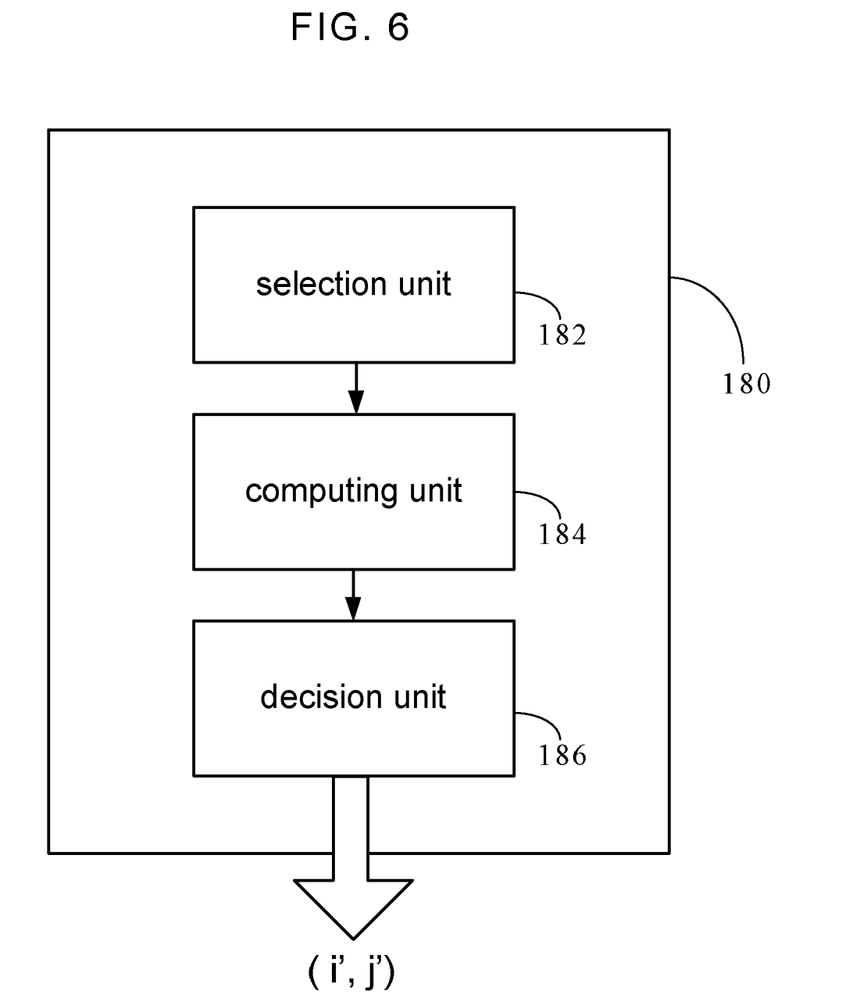
FIG. 6 is a specific block diagram illustrating a determining module according to one preferred embodiment of the present invention.

What follows is a detail of the exact working manner with respect to the determining module 180. Referring to FIG. 6, FIG. 6 is a specific block diagram illustrating a determining module according to one preferred embodiment of the present invention. The determining module 180 includes a selection unit 182, a computing unit 184, and a decision unit 186. The selection unit 182 selects a first group of multiple falling crosstalk values less than a first numeric value among the falling crosstalk values. For instance, the first numeric value is 0.1%. Using FIG. 5 as an example, the value selection is to select the multiple falling crosstalk values less than 0.1% (including negative) among the plurality of falling crosstalk values within FIG. 5, and combinations of gray scales corresponding to these crosstalk values are defined as the first group. Then it selects a second group of multiple rising crosstalk values less than a second numeric value among the rising crosstalk values. For instance, the second numeric value is 0.1%. Using FIG. 5 as an example, the value selection is to select the multiple rising crosstalk values less than 0.1% (including negative) among the plurality of rising crosstalk values within FIG. 5, and combinations of gray scales corresponding to these crosstalk values are defined as the second group.

The computing unit 184 computes sums of the rising crosstalk value to the power of p and the falling crosstalk value to the power of q for every pair of the first gray scale and the second gray scale from a plurality of pairs of the first gray scales and the second gray scales (e.g. 96, 144) corresponding to the first group and the second group. In the embodiment, both p and q are positive integers, and p is larger than q. Preferably, p is 8; q is 2. Subsequently, the decision unit 186 selects the first gray scale and the second gray scale corresponding to a minimum sum among the sums from the plurality of pairs of the first gray scales and the second gray scales to be utilized as the first over-drive gray scale i' and the second over-drive gray scale j'. In a mathematical expression, that is minimum (Crosstalk$_{falling}$^n+Crosstalk$_{rising}$^m, m>n). It can be seen from the foregoing that a set of the suitable over-drive gray scales (i', j') can be fast and accurately calculated by the computation of the crosstalk values and the processing of the determining module 180, whereby an adjustment error and low efficiency brought by manual operation can be avoided.

The method for generating over-drive values employing the over-drive value generating apparatus 10 of the above-mentioned embodiment will be discussed in the following. The descriptions of the same elements in the method have been explained as above mention, so no further detail will be provided herein. The method for generating over-drive values of the embodiment is applied to the 3D display device 30 used with the shutter glasses 20 for determining suitable over-drive values. The 3D display device 30 includes a first gray scale i of a pixel 302 for displaying a first-eye image and a second gray scale j of a corresponding pixel 304 for displaying a second-eye image. Referring to FIG. 1 to FIG. 7, FIG. 7 is a flow chart illustrating a method for generating over-drive values according to the present invention. The method begins with step S10.

Figure 7:
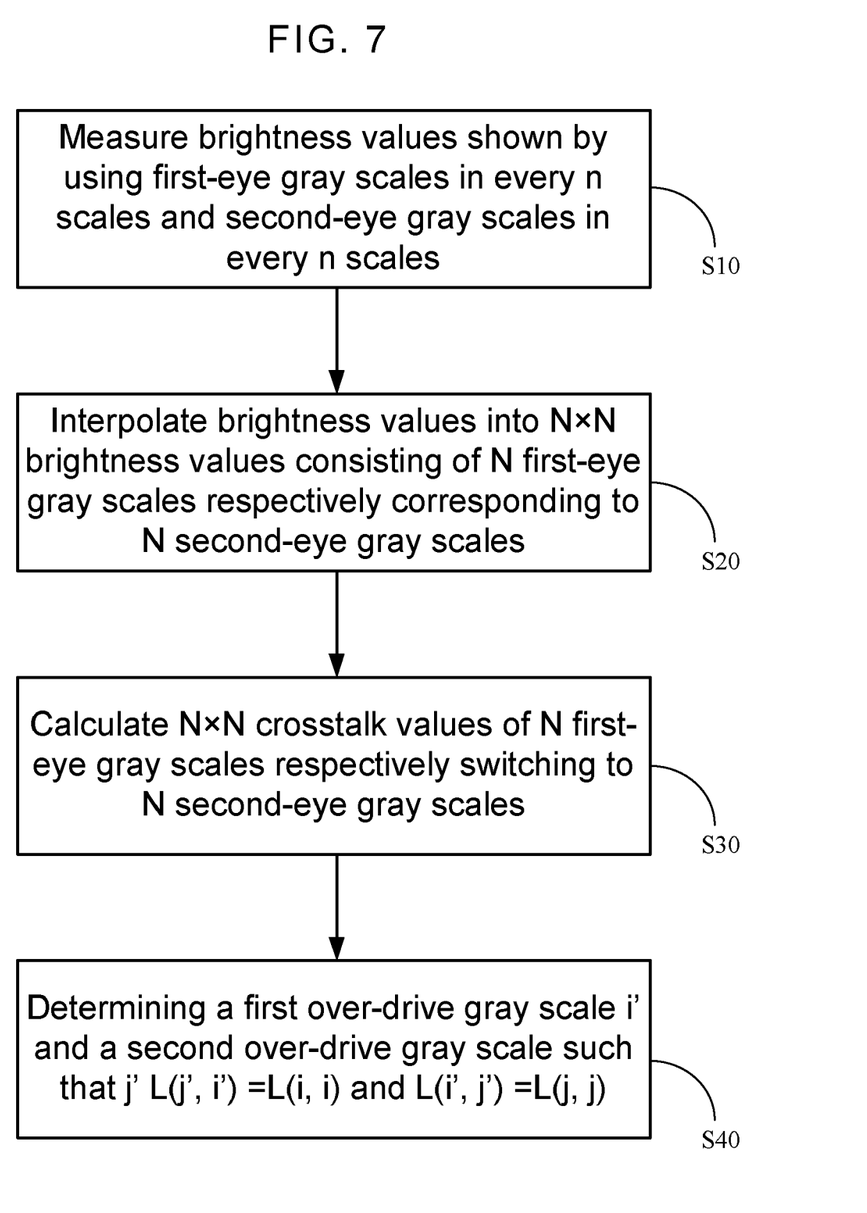
FIG. 7 is a flow chart illustrating a method for generating over-drive values according to the present invention.

At step S10, the measuring module 120 is utilized to measure a plurality of brightness values shown by using a plurality of first-eye gray scales in every n scales and a plurality of second-eye gray scales in every n scales at a first-eye channel 202 of the shutter glasses 20, and then execution resumes at step S20.

At step S20, the interpolation module 140 is utilized to linearly interpolate the brightness values into N×N brightness values which consist of N first-eye gray scales respectively corresponding to N second-eye gray scales, where n and N are positive integers and N>n, and then execution resumes at step S30. Specifically, the interpolation step is linear interpolation.

At step S30, the calculating module 160 is utilized to calculate N×N crosstalk values of the N first-eye gray scales respectively switching to the N second-eye gray scales 160 according to the N×N brightness values. Similarly, the N×N crosstalk values include a plurality of rising crosstalk values and falling crosstalk values.

At step S40, determining a first over-drive gray scale i' and a second over-drive gray scale j' according to the N×N crosstalk values such that the brightness value of the pixel being in the second over-drive gray scale j' and the corresponding pixel being in the first over-drive gray scale i' is about equal to the brightness value of both the pixel and the corresponding pixel being in the first gray scale i; and such that the brightness value of the pixel being in the first over-drive gray scale i' and the corresponding pixel being in the second over-drive gray scale j' is about equal to the brightness value of both the pixel and the corresponding pixel being in the second gray scale j. That is to say, L(j', i') =L(i, i) and L(i', j') =L(j, j) are satisfied.

Figure 8:
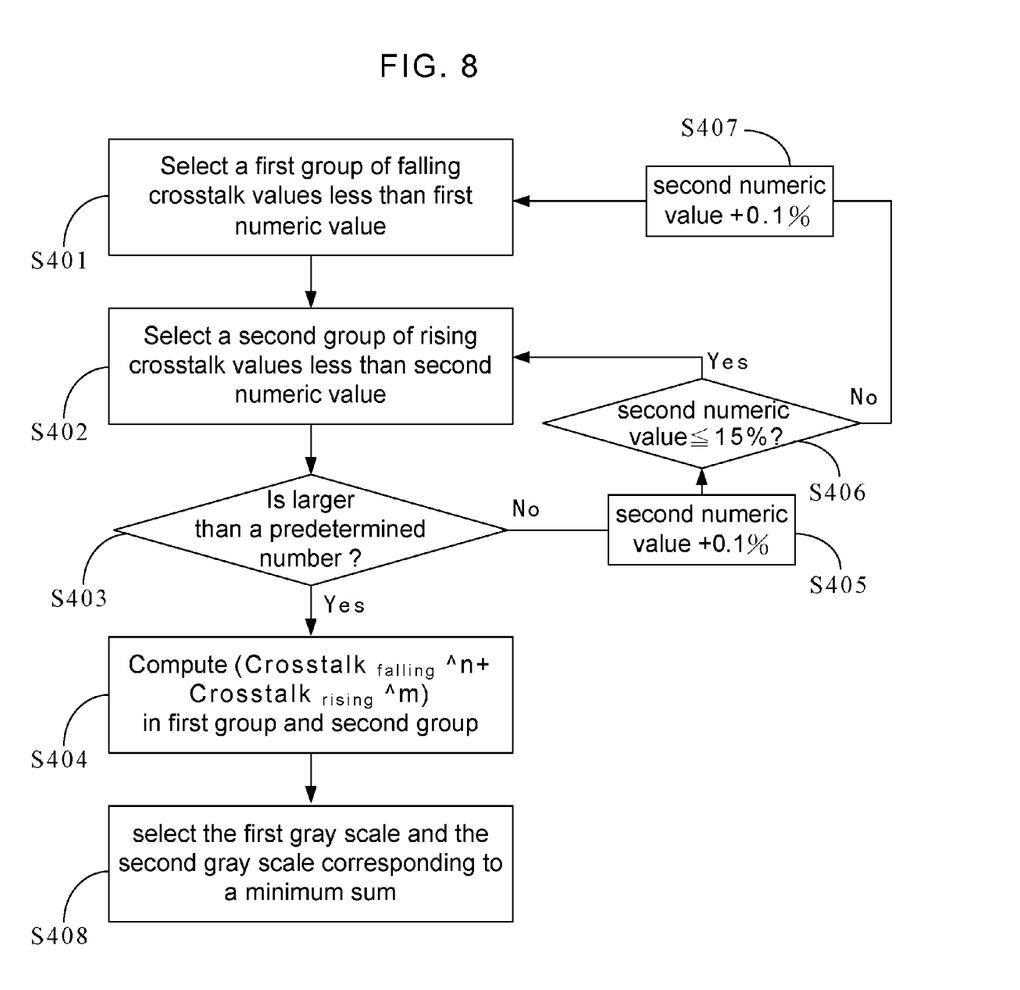
FIG. 8 depicts a specific flow chart illustrating determining step S40 in FIG. 7.

More specifically, the step S40 further includes the following step of: Referring to FIG. 8, FIG. 8 depicts a specific flow chart illustrating the determining step S40 in FIG. 7. The determining step S40 begins with step S401.

At step S401, a first group of multiple falling crosstalk values less than a first numeric value among the falling crosstalk values is selected, and then execution resumes at step S402. For example, the first numeric value is 0.1%. Using FIG. 5 as an example, the multiple falling crosstalk values less than 0.1% (including negative) among the plurality of falling crosstalk values within FIG. 5 are selected, and the combinations of gray scales corresponding to these crosstalk values are defined as the first group.

At step S402, a second group of multiple rising crosstalk values less than a second numeric value among the rising crosstalk values is selected, and then execution resumes at step S403. For example, the second numeric value is 0.1%. Using FIG. 5 as an example, the multiple falling crosstalk values less than 0.1% (including negative) among the plurality of falling crosstalk values within FIG. 5 are selected, and the combinations of gray scales corresponding to these crosstalk values are defined as the second group.

At step S403, the step is done by determining whether the number of the first group plus the second group is larger than a predetermined number, if yes, then carrying out step S404, if not, then carrying out step S405. In the embodiment, the predetermined number is set to 20. However, the present invention is without prejudice to the predetermined number to be 20, and other numbers are also within the scope of the present invention.

At step S405, the step is done by adding 0.1% to the second numeric value to become the new second numeric value, and then the step S406 is performed. It should be noted that the present invention does not limit 0.1%, and other numeric values are also within the scope of the present invention.

At step S406, the step is done by determining whether the second numeric value is less than or equal to 15%, if yes, then returning to step S402, if not, then carrying out step S407. Similarly, the present invention is without prejudice to 15%, and other numeric values are also within the scope of the present invention.

At step S407, the step is done by adding 0.1% to the first numeric value to become the new first numeric value, and then execution returns to step S401. It should be noted that the present invention does not limit 0.1%, and other numeric values are also within the scope of the present invention.

At step S404, the step is done by computing sums of the rising crosstalk value to the power of p and the falling crosstalk value to the power of q for every pair of the first gray scale and the second gray scale from a plurality of pairs of the first gray scales and the second gray scales (e.g. 96, 144) corresponding to the first group and the second group, and then execution resumes at step S408. In the embodiment, both p and q are positive integers, and p is larger than q. Preferably, p is 8; q is 2. Similarly, the present invention does not limit the precise numeric values of p and q, and other numeric values are also within the scope of the present invention.

At step S408, the step is done by selecting the first gray scale and the second gray scale corresponding to a minimum sum among the sums from the plurality of pairs of the first gray scales and the second gray scales to be utilized as the first over-drive gray scale i' and the second over-drive gray scale j'. In a mathematical expression, that is minimum (Crosstalk$_{falling}$^n+Crosstalk$_{rising}$^M, m>n). It can be seen from the foregoing that the method for generating over-drive values in the embodiment is capable of fast and accurately determining the over-drive values, so as to establish the over-drive (voltage) look-up table.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been defined above generally in terms of their functionality. Whether such functionality is implemented as hardware or software depends upon the particular application and design constraints imposed on the overall system. Skilled artisans may implement the described functionality in varying ways for each unique application, but such implementation decisions should not be interpreted as causing a departure from the scope of the present invention.

The steps of a method or algorithm described in connection with the embodiments disclosed herein may be embodied directly in hardware. In a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In summary, the over-drive value generating apparatus of the present invention employs the interpolation module which is capable of decreasing the number of times for measuring the brightness values. In addition, a set of the suitable over-drive gray scales (i', j') can be fast and accurately calculated by the computation of the crosstalk values and the processing of the determining module, whereby adjustment error and low efficiency brought by manual operation can be avoided.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for generating over-drive values applied to a 3D display device used with shutter glasses, the 3D display device comprising a first gray scale of a pixel for displaying a first-eye image and a second gray scale of a corresponding pixel for displaying a second-eye image, the method comprising the steps of:
   measuring a plurality of brightness values shown by using a plurality of first-eye gray scales in every n scales and a plurality of second-eye gray scales in every n scales at a first-eye channel of the shutter glasses;
   linearly interpolating the brightness values into N×N brightness values which consist of N first-eye gray scales respectively corresponding to N second-eye gray scales, wherein n and N are positive integers and N>n;
   calculating N×N crosstalk values of the N first-eye gray scales respectively switching to the N second-eye gray scales according to the N×N brightness values, wherein the N×N crosstalk values comprise a plurality of rising crosstalk values and falling crosstalk values; and
   determining a first over-drive gray scale and a second over-drive gray scale according to the N×N crosstalk values, such that a brightness value of a pixel being in the second over-drive gray scale and a brightness value of a corresponding pixel being in the first over-drive gray scale is equal to a brightness value of both the pixel and a corresponding pixel being in the first gray scale and such that a brightness value of the corresponding pixel being in the first over-drive gray scale and a brightness value of a corresponding pixel being in the second over-drive gray scale is equal to a brightness value of both the pixel and a corresponding pixel being in the second gray scale;
   wherein the step of determining comprises:
   selecting a first group of multiple falling crosstalk values less than a first numeric value among the falling crosstalk values, and then selecting a second group of multiple rising crosstalk values less than a second numeric value among the rising crosstalk values;
   computing sums of the rising crosstalk values to a power of p and the falling crosstalk values to a power of q for every pair of the first gray scale and the second gray scale from a plurality of pairs of the first gray scales and the second gray scales corresponding to the first group and the second group, wherein p and q are positive integers and p is larger than q; and
   selecting the first gray scale and the second gray scale corresponding to a minimum sum among the sums from the plurality of pairs of the first gray scales and the second gray scales to be utilized as the first over-drive gray scale and the second over-drive gray scale.

2. The method according to claim 1, wherein the first numeric value is 0.1%.

3. The method according to claim 1, wherein the second numeric value is between 0.1% and 15%.

4. An over-drive value generating apparatus applied to a 3D display device used with shutter glasses, the 3D display device comprising a first gray scale of a pixel for displaying a first-eye image and a second gray scale of a corresponding pixel for displaying a second-eye image, the apparatus including a processor that executes a method, the method comprising:
   measuring a plurality of brightness values shown by using a plurality of first-eye gray scales in every n scales and a plurality of second-eye gray scales in every n scales at a first-eye channel of the shutter glasses;
   linearly interpolating the brightness values into N×N brightness values which consist of N first-eye gray scales respectively corresponding to N second-eye gray scales, wherein n and N are positive integers and N>n;
   calculating N×N crosstalk values of the N first-eye gray scales respectively switching to the N second-eye gray scales according to the N×N brightness values; and
   determining a first over-drive gray scale and a second over-drive gray scale according to the N×N crosstalk values, such that a brightness value of a pixel being in the second over-drive gray scale and a brightness value of a corresponding pixel being in the first over-drive gray scale is equal to a brightness value of both the pixel and a corresponding pixel being in the first gray scale and such that a brightness value of the corresponding pixel being in the first over-drive gray scale and a brightness value of the corresponding pixel being in the second over-drive gray scale is equal to a brightness value of both the pixel and a corresponding pixel being in the second gray scale;

wherein the N×N crosstalk values comprise a plurality of rising crosstalk values and falling crosstalk values; wherein the determining comprises:

selecting a first group of multiple falling crosstalk values less than a first numeric value among the falling crosstalk values, and then selecting a second group of multiple rising crosstalk values less than a second numeric value among the rising crosstalk values;

computing sums of the rising crosstalk values to a power of p and the falling crosstalk values to a power of q for every pair of the first gray scale and the second gray scale from a plurality of pairs of the first gray scales and the second gray scales corresponding to the first group and the second group, wherein p and q are positive integers and p is larger than q; and selecting the first gray scale and the second gray scale corresponding to a minimum sum among the sums from the plurality of pairs of the first gray scales and the second gray scales to be utilized as the first over-drive gray scale and the second over-drive gray scale.

5. The over-drive value generating apparatus according to claim 4, wherein the n scales are smaller than or equal to 8 scales, and N is 256.

6. A method for generating over-drive values applied to a 3D display device used with shutter glasses, the 3D display device comprising a first gray scale of a pixel for displaying a first-eye image and a second gray scale of a corresponding pixel for displaying a second-eye image, the method comprising the steps of:

measuring a plurality of brightness values shown by a plurality of first-eye gray scales in every n scales and a plurality of second-eye gray scales in every n scales at a first-eye channel of the shutter glasses;

interpolating the brightness values into N×N brightness values which consist of N first-eye gray scales respectively corresponding to N second-eye gray scales, wherein n and N are positive integers and N>n;

calculating N×N crosstalk values of the N first-eye gray scales respectively switching to the N second-eye gray scales according to the N×N brightness values; and determining a first over-drive gray scale and a second over-drive gray scale according to the N×N crosstalk values, such that a brightness value of a pixel being in the second over-drive gray scale and a brightness value of a corresponding pixel being in the first over-drive gray scale is equal to a brightness value of both the pixel and a corresponding pixel being in the first gray scale and such that a brightness value of the corresponding pixel being in the first over-drive gray scale and a brightness value of a corresponding pixel being in the second over-drive gray scale is equal to a brightness value of both the pixel and a corresponding pixel being in the second gray scale;

wherein the N×N crosstalk values comprise a plurality of rising crosstalk values and falling crosstalk values;

wherein the step of determining comprises:

selecting a first group of multiple falling crosstalk values less than a first numeric value among the falling crosstalk values, and then selecting a second group of multiple rising crosstalk values less than a second numeric value among the rising crosstalk values;

computing sums of the rising crosstalk values to a power of p and the falling crosstalk values to a power of q for every pair of the first gray scale and the second gray scale from a plurality of pairs of the first gray scales and the second gray scales corresponding to the first group and the second group, wherein p and q are positive integers and p is larger than q; and selecting the first gray scale and the second gray scale corresponding to a minimum sum among the sums from the plurality of pairs of the first gray scales and the second gray scales to be utilized as the first over-drive gray scale and the second over-drive gray scale.

7. The method according to claim 6, wherein the interpolation step is linear interpolation.

\* \* \* \* \*